United States Patent
Huang et al.

(10) Patent No.: US 12,354,000 B2
(45) Date of Patent: Jul. 8, 2025

(54) WIND SPEED PREDICTION METHOD BASED ON FORWARD COMPLEX-VALUED NEURAL NETWORK

(71) Applicant: SOOCHOW UNIVERSITY, Suzhou (CN)

(72) Inventors: He Huang, Suzhou (CN); Zhongying Dong, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 642 days.

(21) Appl. No.: 17/789,038

(22) PCT Filed: Sep. 6, 2021

(86) PCT No.: PCT/CN2021/116621
§ 371 (c)(1),
(2) Date: Jun. 24, 2022

(87) PCT Pub. No.: WO2022/247049
PCT Pub. Date: Dec. 1, 2022

(65) Prior Publication Data
US 2023/0316069 A1    Oct. 5, 2023

(30) Foreign Application Priority Data
May 24, 2021   (CN) .......................... 202110565347.0

(51) Int. Cl.
*G06N 3/08* (2023.01)
*G06N 5/022* (2023.01)
(52) U.S. Cl.
CPC ............... *G06N 3/08* (2013.01); *G06N 5/022* (2013.01)
(58) Field of Classification Search
None
See application file for complete search history.

(56) References Cited

U.S. PATENT DOCUMENTS

2016/0132768 A1*  5/2016  Ray .......................... G06N 3/08 706/22
2018/0096246 A1*  4/2018  Yamamoto ............... G06N 3/08
(Continued)

FOREIGN PATENT DOCUMENTS

| CN | 105243259 A | 1/2016 |
|---|---|---|
| CN | 106295794 A | 1/2017 |

(Continued)

OTHER PUBLICATIONS

Zhongying Dong et al. "A Structural Optimization Algorithm for Complex-Valued Neural Networks" 2019 IEEE Symposium Series on Computational Intelligence (SSCI), pp. 1530-1535 (Feb. 20, 2020).

(Continued)

*Primary Examiner* — Ryan Barrett
(74) *Attorney, Agent, or Firm* — SZDC Law PC

(57) ABSTRACT

The invention discloses a wind speed prediction method based on feedforward complex-valued neural network (FCVNN), including: acquiring a training set and a prediction set for wind speed prediction, and constructing a FCVNN, and initializing a parameter vector; and introducing a Group Lasso regularization term into a target function for training, transferring the training into solving a constrained optimization problem, training the FCVNN by using the training set and a specialized complex-valued projected quasi-newton algorithm, stopping the training until a preset condition is met, obtaining the trained FCVNN, and inputting the prediction set into the established FCVNN to obtain a wind speed prediction result. A Group (Continued)

Lasso regularization term is introduced and a FCVNN is trained by using a specialized complex-valued projected quasi-Newton algorithm to optimize the network structure and parameters, thereby obtaining a compact network structure and high generalization performance and improving the accuracy of wind speed prediction.

10 Claims, 3 Drawing Sheets

(56) References Cited

U.S. PATENT DOCUMENTS

| | | | | |
|---|---|---|---|---|
| 2018/0260702 | A1* | 9/2018 | Yamamoto | G06N 3/084 |
| 2019/0251421 | A1* | 8/2019 | Wang | G06N 3/08 |
| 2019/0327124 | A1* | 10/2019 | Lai | G01S 5/017 |
| 2020/0042873 | A1* | 2/2020 | Daval Frerot | G06N 3/048 |
| 2020/0066260 | A1* | 2/2020 | Hayakawa | G10L 15/22 |
| 2020/0074290 | A1* | 3/2020 | Trabelsi | G06N 3/044 |
| 2020/0218967 | A1* | 7/2020 | Strachan | G06N 3/08 |
| 2020/0406860 | A1* | 12/2020 | Mai | B60R 25/31 |
| 2022/0061818 | A1* | 3/2022 | Takeshima | G06N 3/045 |
| 2022/0358345 | A1* | 11/2022 | Kim | G11C 11/54 |

FOREIGN PATENT DOCUMENTS

| | | |
|---|---|---|
| CN | 106875002 A | 6/2017 |
| CN | 111160520 A | 5/2020 |
| CN | 111950711 A | 11/2020 |
| CN | 113158582 A | 7/2021 |

OTHER PUBLICATIONS

Zhongying Dong et al. "A training algorithm with selectable search direction for complex-valued feedforward neural hetworks" Neural Networks 137 (2021) 75-84 (Jan. 28, 2021).

Rongrong Wu, "Study of learning algorithms of complex-valued feedforward neural networks with applications" Master's Thesis, Soochow University (Jan. 15, 2019).

* cited by examiner

WIND SPEED PREDICTION METHOD BASED ON FORWARD COMPLEX-VALUED NEURAL NETWORK

This application is the National Stage Application of PCT/CN2021/116621, filed on Sep. 6, 2021, which claims priority to Chinese Patent Application No. 202110565347.0, filed on May 24, 2021, which is incorporated by reference for all purposes as if fully set forth herein.

FIELD OF THE INVENTION

The present invention relates to the field of wind speed prediction technologies, and more particularly to a wind speed prediction method based on a feedforward complex-valued neural network.

DESCRIPTION OF THE RELATED ART

Compared with some traditional non-renewable energy sources such as oil, wind energy has attracted more and more attention as a green and environmentally friendly renewable energy source. The development of wind energy has become a current trend. However, due to the random and intermittent nature of wind speed, the instability of wind speed may pose a threat to the safety and stability of a power grid system. Therefore, accurate wind speed prediction plays a crucial role in the development of wind energy.

Currently, there are mainly two kinds of wind speed prediction methods. One is a physical model prediction method based on weather forecast data, and the other is a wind speed prediction method based on historical data. However, due to the lack of numerical meteorological information, the physical model prediction method based on weather forecast data is relatively seldom used. Therefore, dynamic changes in wind speed are mostly predicted by using historical data. The prediction of dynamic changes in wind speed based on historical data is widely used in wind power stations. Common methods include the prediction of dynamic changes in wind speed by using artificial neural networks, support vector machines, and Kalman filtering.

As a simple and effective modeling method, artificial neural networks have excellent nonlinear mapping and approximation capabilities, and have been widely used in wind speed prediction and related applications in recent years. However, when artificial neural network models are used for wind speed prediction, it is often difficult to achieve the expected performance in wind speed prediction due to inappropriate design of a network structure. Therefore, the selection of an appropriate network structure is an urgent problem to be resolved for artificial neural network methods. The simplest method is to determine a relatively appropriate structure through manual trial and error. However, this method is time-consuming and laborious. In addition, a gradient descent method is widely used in a training process of feedforward neural networks to obtain appropriate network weights and biases, but the gradient descent method is prone to problems such as falling into local minima and slow convergence. Therefore, how to design an appropriate training method to find an appropriate network structure and appropriate parameters also deserves further research.

SUMMARY OF THE INVENTION

For this, a technical problem to be resolved by the present invention is to overcome disadvantages in the prior art, and provide a wind speed prediction method based on a feedforward complex-valued neural network that can implement optimization of both a network structure and parameters.

To resolve the foregoing technical problems, the present invention provides a wind speed prediction method based on a feedforward complex-valued neural network, including the following steps:

step 1: acquiring data used for wind speed prediction, arranging the data as a data set, and dividing the data set into a training set and a prediction set;

step 2: constructing a feedforward complex-valued neural network, and initializing a parameter vector $\psi$ in the feedforward complex-valued neural network, where the parameter vector $\psi$ is formed by adjustable parameters including connection weights between neurons, biases of neurons, and gain coefficients of activation functions;

step 3: introducing a Group Lasso regularization term to construct a target function during the training of the feedforward complex-valued neural network, and converting the training of the feedforward complex-valued neural network into solving a constrained optimization problem; and training the feedforward complex-valued neural network by using the training set and a specialized complex-valued projected quasi-Newton algorithm, and stopping the training until a preset iteration termination condition is met; and step 4: obtaining the trained feedforward complex-valued neural network, and inputting the prediction set into the trained feedforward complex-valued neural network to obtain a wind speed prediction result.

Preferably, in step 2, the constructed feedforward complex-valued neural network includes P input neurons, N hidden neurons, and Q output neurons, the parameter vector $\psi$ in the feedforward complex-valued neural network is a column vector, and all the adjustable parameters are arranged in an order to obtain the parameter vector $\psi$:

$$\psi = \left[ \begin{array}{c} (w_1^R)^T, (w_1^I)^T, \ldots, (w_P^R)^T, (w_P^I)^T, (b_1^R)^T, (b_1^I)^T, (\sigma_1^R)^T, \\ (\sigma_1^I)^T, (v_1^R)^T, (v_1^I)^T, \ldots, (v_N^R)^T, (v_N^I)^T, (b_2^R)^T, (b_2^I)^T, (\sigma_2^R)^T, (\sigma_2^I)^T \end{array} \right]^T =$$

$$\left[ \begin{array}{c} (ri(w_1))^T, \ldots, (ri(w_P))^T, (ri(b_1))^T, (\sigma_1^R)^T, (\sigma_1^I)^T, \\ (ri(v_1))^T, \ldots, (ri(v_N))^T, (ri(b_2))^T, (\sigma_2^R)^T, (\sigma_2^I)^T \end{array} \right]^T$$

where $w_p$ represents a complex vector formed by connection weights between a $p^{th}$ input neuron and the hidden neurons, $b_1$ represents a complex vector formed by biases of all the hidden neurons, $\sigma_1$ represents a complex vector formed by gain coefficients of activation functions of the hidden neurons, $v_n$ represents a complex vector formed by connection weights between an $n^{th}$ hidden neuron and the output neurons, $b_2$ is a complex vector formed by biases of all the output neurons, $\sigma_2$ represents a complex vector formed by gain coefficients of activation functions of the output neurons, and the superscript T represents transpose; and the superscript R represents a vector formed by real parts of corresponding complex vector, the superscript I represents a vector formed by imaginary parts of corresponding complex vector, and $$ri(\cdot) = \binom{(\cdot)^R}{(\cdot)^I};$$

and a hidden output vector of the feedforward complex-valued neural network is $h_j=f_C(Wz_j+b_1)$, and an output vector of the output layer is $o_j=f_C(Vh_j+b_2)$, where $f_C(\cdot)$ represents an activation function, $W=[w_1, w_2, \ldots, w_P]$ is a weight matrix between the input and hidden neurons, and $z_j$ is a $j^{th}$ input sample of the feedforward complex-valued neural network; and $V=[v_1, v_2, \ldots, v_N]$ is a weight matrix between the hidden and output neurons.

Preferably, a specific process of step 3 includes:

step 3.1: introducing a Group Lasso regularization term $R_{GL}$ into a traditional mean square error function E' to obtain a target function E during the training of the feedforward complex-valued neural network;

step 3.2: introducing a group of artificial variables $\rho_a$ to convert an unconstrained optimization problem $$\min_{\psi} E = E' + \lambda \sum_{a=1}^{A} \sqrt{|\psi_a|} \|\psi_a\|$$

into a constrained optimization problem $$\min_{\overline{\psi}} E = E' + \lambda \sum_{a=1}^{A} \sqrt{|\psi_a|} \rho_a, \text{ s.t. } \|\psi_a\| \leq \rho_a, a = 1, 2, \ldots, A;$$

and defining $\rho=[\rho_1, \rho_2, \ldots, \rho_A]^T$ as a real vector formed by the introduced variables $\rho_a$, where a parameter vector that needs to be optimized during the training process in this case is $\overline{\psi}=[\psi^T, \rho^T]^T$;

step 3.3: calculating an approximate Hessian matrix $H^{(m)}$ by using matrices $$S = \{s^{(i)}\}_{i=m-\tau}^{i=m-1} \text{ and } R = \{r^{(i)}\}_{i=m-\tau}^{i=m-1},$$

and obtaining an approximate quadratic optimization problem with a constraint condition, where $\tau$ is a constant, representing that a parameter variation $s^i$ and a gradient variation) $r^{(i)}$ of the latest $\tau$ iterations are kept; and $s^{(i)}=\overline{\psi}^{(i+1)}-\overline{\psi}^{(i)}$, $r^{(i)}=\nabla E(\overline{\psi}^{(i+1)})-\nabla E(\overline{\psi}^{(i)})$, $\overline{\psi}^{(i+1)}$ represents a parameter vector value of $\overline{\psi}$ at the $(i+1)^{th}$ iteration, $\overline{\psi}^{(i)}$ represents a parameter vector value of $\overline{\psi}$ at the $i^{th}$ iteration, $\nabla E(\overline{\psi}^{(i)})$ represents a gradient of the target function E at $\overline{\psi}^{(i)}$, $\nabla E(\overline{\psi}^{(i+1)})$ represents a gradient of the target function E at $\overline{\psi}^{(i+1)}$, S represents a matrix formed by parameter variations $s^{(i)}$ from the $(m-\tau)^{th}$ to $(m-1)^{th}$ iterations, R represents a matrix formed by gradient variations $r^{(i)}$ from the $(m-\tau)^{th}$ to $(m-1)^{th}$ iterations, and m represents an iteration number;

step 3.4: solving the approximate quadratic optimization problem with a constraint condition by using a spectral projected gradient algorithm, to obtain a solution $\overline{\psi}^*$ of the approximate quadratic optimization problem with a constraint condition;

step 3.5: calculating a feasible descending direction $d^{(m)}$ of the original constrained optimization problem $$\min_{\overline{\psi}} E = E' + \lambda \sum_{a=1}^{A} \sqrt{|\psi_a|} \rho_a, \text{ s.t. } \|\psi_a\| \leq \rho_a, a = 1, 2, \ldots, A$$

at the $m^{th}$ iteration by using the solution $\overline{\psi}^*$ of the approximate quadratic optimization problem with a constraint condition, and using Armijo line search to determine an approximate learning step size $\eta^{(m)}$;

step 3.6: updating $\overline{\psi}$ by using $d^{(m)}$ and $\eta^{(m)}$, and updating the matrices S and R;

step 3.7: repeating step 3.3 to step 3.6, and stopping the training of the feedforward complex-valued neural network until the preset iteration termination condition is met.

Preferably, the Group Lasso regularization term in step 3.1 is $$R_{GL} = \lambda \sum_{a=1}^{A} \sqrt{|\psi_a|} \|\psi_a\|,$$

and the target function E for the training of the feedforward complex-valued neural network is:

$$\min_{\psi} E + E' + R_{GL} = \frac{1}{2J} \sum_{j=1}^{J} (o_j - y_j)^H (o_j - y_j) + \lambda \sum_{a=1}^{A} \sqrt{|\psi_a|} \|\psi_a\|,$$

where $$E' = \frac{1}{2J} \sum_{j=1}^{J} (o_j - y_j)^H (o_j - y_j)$$

is the traditional mean square error function, J is a total number of training samples, $o_j$ represents an actual output of a $j^{th}$ training sample, $y_j$ represents a desired output of the $j^{th}$ training sample, and the superscript H represents the conjugate transpose; $\lambda$ is a regularization coefficient, a=1, 2, ..., A, A=P+N+2 represents a total number of neurons that may be penalized, that is, P input neurons, N o hidden neurons, and 2 bias nodes; and $|\cdot|$ represents a dimensionality of a vector, $\|\cdot\|$ is a Euclidean norm, and $\psi_a$ represents a vector formed by connection weights between an $a^{th}$ neuron and all neurons in a next layer in the feedforward complex-valued neural network.

Preferably, a specific process of the step 3.3 includes:

step 3.3.1: using a calculation formula of the approximate Hessian matrix $H^{(m)}$:

$$H^{(m)} = \sigma^{(m)} I - NM^{-1} N^T,$$

where $$\sigma^{(m)} = \frac{(r^{(m-1)})^T r^{(m-1)}}{(r^{(m-1)})^T s^{(m-1)}},$$

$r^{(m-1)}=\nabla E(\overline{\psi}^{(m)})-\nabla E(\overline{\psi}^{(m-1)})$, and $s^{(m-1)}=\overline{\psi}^{(m)}-\overline{\psi}^{(m-1)}$; $N=[\sigma^{(m)} S \; R]$, $$M = \begin{bmatrix} \sigma^{(m)} S^T S & L \\ L & -D \end{bmatrix},$$

L is a matrix formed by elements $$L_{ij} = \begin{cases} (s^{(m-\tau-1+i)})^T (r^{(m-\tau-1+j)}) & i > j \\ 0 & i \leq j \end{cases},$$

I is an identity matrix, and $D=\text{diag}[(s^{(m-\tau)})^T(r^{(m-\tau)}), \ldots, (s^{(m-1)})^T(r^{(m-1)})]$ is a diagonal matrix; and step 3.3.2: obtaining the approximate quadratic optimization problem with a constraint condition at the $m^{th}$ iteration by using the approximate Hessian matrix $H^{(m)}$:

$$\min_{\overline{\Psi}} Q = E(\overline{\Psi}^{(m)}) + (\overline{\Psi} - \overline{\Psi}^{(m)})^T \nabla E(\overline{\Psi}^{(m)}) + \frac{1}{2}(\overline{\Psi} - \overline{\Psi}^{(m)})^T H^{(m)}(\overline{\Psi} - \overline{\Psi}^{(m)})$$

$$\text{s.t. } \|\Psi_a\| \leq \rho_a, a = 1, 2, \ldots, A$$

Preferably, the step 3.4 includes:
step 3.4.1: calculating $\eta_{bb}^{(t)}$ by using a formula $$\eta_{bb}^{(t)} = \frac{(qs^{(t-1)})^T qs^{(t-1)}}{(qr^{(t-1)})^T qs^{(t-1)}},$$

and calculating $\overline{\psi}_+^{(t)}$ according to a formula $\overline{\psi}_+^{(t)} = \overline{\psi}^{(t)} - \eta_{bb}^{(t)} \nabla Q(\overline{\psi}^{(t)})$, where $qs^{(t-1)} = \overline{\psi}^{(t)} - \overline{\psi}^{(t-1)}$, $qr^{(t-1)} = \nabla Q(\overline{\psi}^{(t)}) - \nabla Q(\overline{\psi}^{(t-1)})$, $\nabla Q(\overline{\psi}^{(t)})$ represents a gradient of the target function of the approximate quadratic optimization problem with a constraint condition at $\overline{\psi}^{(t)}$, and t represents the iteration number for optimizing the approximate quadratic optimization problem with a constraint condition by using the spectral projected gradient algorithm;

step 3.4.2: correcting parameters of each group of neurons in $\overline{\psi}_+^{(t)}$ by using a projection operator $$P_\Omega(\psi_a, \rho_a) = \begin{cases} (\psi_a, \rho_a) & \|\psi_a\| \leq \rho_a \\ \left(\frac{\psi_a}{\|\psi_a\|} \frac{\|\psi_a\| + \rho_a}{2}, \frac{\|\psi_a\| + \rho_a}{2}\right) & \|\psi_a\| > \rho_a, \|\psi_a\| + \rho_a > 0 \\ (0, 0) & \|\psi_a\| > \rho_a, \|\psi_a\| + \rho_a \leq 0 \end{cases}$$

to make the parameters meet a constraint condition $\|\psi_a\| \leq \rho_a$, $a=1,2,\ldots,A$, and calculating $\overline{\psi}_p^{(t)}$;

step 3.4.3: obtaining, according to a formula $d_q^{(t)} = \overline{\psi}_p^{(t)} - \overline{\psi}^{(t)}$, a search direction $d_q^{(t)}$ of solving the approximate quadratic optimization problem with a constraint condition at the $t^{th}$ iteration;

step 3.4.4: obtaining a learning step size $\eta_q^{(t)}$ of the search direction $d_q^{(t)}$ by using a nonmonotone line search:

$$Q(\overline{\psi}^{(t)} + \eta_q^{(t)} d_q^{(t)}) \leq \max_{t-k \leq i \leq t} Q(\overline{\psi}^{(i)}) + l_3 \eta_q^{(t)} \nabla Q(\overline{\psi}^{(t)})^T d_q^{(t)},$$

$$l_3 \in (0, 1);$$

and
step 3.4.5: updating the parameters according to a formula $\overline{\psi}^{(t+1)} = \overline{\psi}^{(t)} + \eta_q^{(t)} d_q^{(t)}$, and determining whether the quantity of times of evaluation of the target function of the approximate quadratic optimization problem with a constraint condition is greater than a preset constant $T_e$,
wherein if not, the process returns to step 3.4.1, or if yes, the algorithm stops, to obtain a solution $\overline{\psi}^*$ of the approximate quadratic optimization problem with a constraint condition.

Preferably, a calculation method of the feasible descending direction $d^{(m)}$ in step 3.5 includes:
at the $m^{th}$ iteration of the specialized complex-valued projected quasi-Newton algorithm, first calculating a solution $\overline{\psi}^*$ of the quadratic optimization problem with a constraint condition by using the spectral projected gradient algorithm, and then obtaining the feasible descending direction $d^{(m)}$ of the original constrained optimization problem $$\min_{\overline{\psi}} E = E' + \lambda \sum_{a=1}^{A} \sqrt{|\psi_a|} \rho_a, \text{ s.t } \|\psi_a\| \leq \rho_a, a = 1, 2, \ldots, A$$

at the $m^{th}$ iteration according to a formula $d^{(m)} = \overline{\psi}^* - \overline{\psi}^{(m)}$.

Preferably, the used Armijo line search to determine an approximate learning step size $\eta^{(m)}$ in step 3.5 is specifically:
determining an appropriate learning step size $\eta^{(m)}$ by using Armijo line search at the $m^{th}$ iteration of the specialized complex-valued projected quasi-Newton algorithm:

$$E(\overline{\psi}^{(m)} + \eta^{(m)} d^{(m)}) \leq E(\overline{\psi}^{(m)}) + l_4 \eta^{(m)} \nabla E(\overline{\psi}^{(m)})^T d^{(m)},$$

where $l_4 \in (0, 1)$, $d^{(m)}$ represents a feasible descending direction of the original constrained optimization problem $$\min_{\overline{\psi}} E = E' + \lambda \sum_{a=1}^{A} \sqrt{|\psi_a|} \rho_a, \text{ s.t } \|\psi_a\| \leq \rho_a, a = 1, 2, \ldots, A$$

at the $m^{th}$ iteration, and $\nabla E(\overline{\psi}^{(m)})$ represents a gradient of the target function E at $\overline{\psi}^{(m)}$.

Preferably, the updating $\overline{\psi}$ by using $d^{(m)}$ and $\eta^{(m)}$, and updating the matrices S and R in step 3.6 include:
updating, according to a formula $\overline{\psi}^{(m+1)} = \overline{\psi}^{(m)} + \eta^{(m)} d^{(m)}$, a parameter vector $\overline{\psi}$ that needs to be optimized in the feedforward complex-valued neural network,
calculating $s^{(m)} = \overline{\psi}^{(m+1)} - \overline{\psi}^{(m)}$ and $r^{(m)} = \nabla E(\overline{\psi}^{(m+1)}) - \nabla E(\overline{\psi}^{(m)})$, storing the information of $s^{(m)}$ and $r^{(m)}$ into the matrices S and R, and discarding $s^{(m-\tau)}$ and $r^{(m-\tau)}$ of the $(m-\tau)^{th}$ iteration from the matrices S and R, to implement the update of S and R.

Preferably, the preset iteration termination condition in step 3 is specifically:
the quantity of times of evaluation of the target function during the training of the feedforward complex-valued neural network reaches a preset maximum quantity of times of evaluation, or a variation between the values of the target function in two consecutive iterations is less than a preset threshold or a maximum variation of an adjustable parameter in $\overline{\psi}$ is less than a preset threshold.

Compared with the prior art, the foregoing technical solutions of the present invention have the following advantages:
(1) In the present invention, a Group Lasso regularization term is introduced into a traditional mean square error function to obtain a target function E for the training of a feedforward complex-valued neural network, so that redundant input neurons and hidden neurons can be effectively deleted during the training process, to implement optimization of a network structure and parameter vectors.
(2) A feedforward complex-valued neural network is trained by using a specialized complex-valued projected quasi-Newton algorithm, and gain coefficients of activation functions may be optimized together as adjustable parameters, so that the adverse impact of the activation function falling in a saturated area during the training process is overcome. In addition, weights of redundant neurons in the feedforward complex-valued neural network are directly reset, where a threshold does not need to be set in advance, and redundant neurons can be directly deleted without causing any impact on a final output of a model, that is, the optimization of both a network structure and parameter vectors can be implemented.

(3) A Group Lasso regularization term is introduced and a feedforward complex-valued neural network is trained by using a specialized complex-valued projected quasi-Newton algorithm, and optimization of a network structure and parameters is implemented, so that the structure of the feedforward complex-valued neural network is compact, the generalization performance of a network model is enhanced, and the feedforward complex-valued neural network has smaller errors for wind speed prediction, thereby improving the accuracy of prediction.

BRIEF DESCRIPTION OF THE DRAWINGS

To make the content of the present invention clearer and more comprehensible, the present invention is further described in detail below according to specific embodiments of the present invention and the accompanying drawings.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

In the description of the present invention, it needs to be understood that the term "include" is intended to cover a non-exclusive inclusion. For example, a process, method, system, product or device that includes a series of steps or units not only includes those specified steps or units, but optionally further includes steps or units that are not specified, or optionally further includes other steps or units that are inherent to these processes, methods, products or devices.

Figure 1:
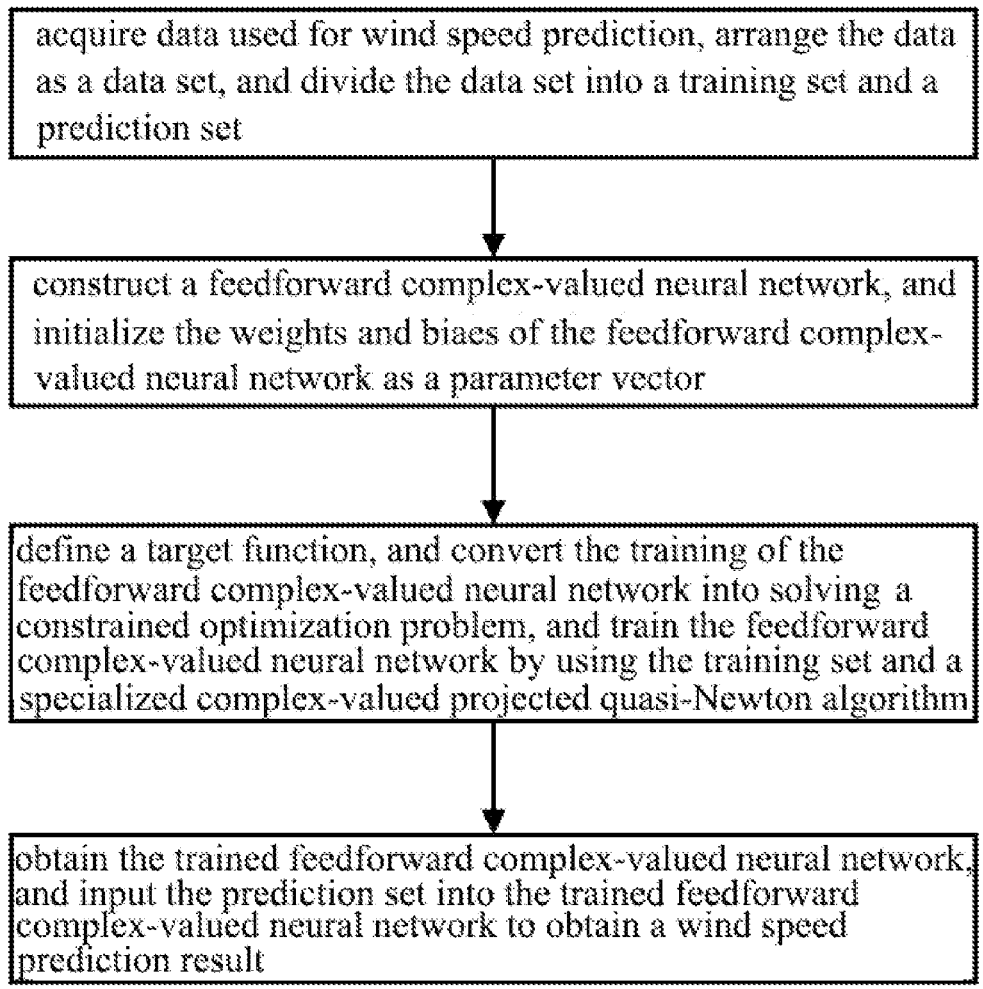
FIG. 1 is a flowchart of the present invention.

Referring to the flowchart in FIG. 1, an embodiment of a wind speed prediction method based on a feedforward complex-valued neural network according to the present invention includes the following steps:

Step 1: Acquire data used for wind speed prediction, arrange the data as a data set, and divide the data set into a training set and a prediction set. The data set is $z=[z^1, z^2, \ldots, z^P]^T$, and P represents a dimension of an input, including six groups of parameters: an average wind speed value, an average wind direction value, a standard deviation, an atmospheric pressure, a temperature, and a humidity. The data set is acquired from historical data. The value of P in this embodiment is 6. The elements in $z=[z^1, z^2, \ldots, z^P]^T$ respectively corresponds to the average wind speed value, the average wind direction value, the standard deviation, the atmospheric pressure, the temperature, and the humidity.

Step 2: Construct a model of a feedforward complex-valued neural network, where a parameter vector in the feedforward complex-valued neural network is formed by adjustable parameters including connection weights between neurons, biases of neurons, and gain coefficients of activation functions. The model of the feedforward complex-valued neural network includes P input neurons (a quantity P of the input neurons is kept consistent with the dimension P of the data set), N hidden neurons, and Q output neurons. A parameter vector $\psi$ in the feedforward complex-valued neural network is a column vector. All the adjustable parameters are arranged in an order to obtain the parameter vector $\psi$:

$$\Psi = \begin{bmatrix} (w_1^R)^T, (w_1^I)^T, \ldots, (w_P^R)^T, (w_P^I)^T, (b_1^R)^T, (b_1^I)^T, (\sigma_1^R)^T, (\sigma_1^I)^T, \\ (v_1^R)^T, (v_1^I)^T, \ldots, (v_N^R)^T, (v_N^I)^T, (b_2^R)^T, (b_2^I)^T, (\sigma_2^R)^T, (\sigma_2^I)^T \end{bmatrix}^T =$$

$$\begin{bmatrix} (ri(w_1))^T, \ldots, (ri(w_P))^T, (ri(b_1))^T, (\sigma_1^R)^T, (\sigma_1^I)^T, \\ (ri(v_1))^T, \ldots, (ri(v_N))^T, (ri(b_2))^T, (\sigma_2^R)^T, (\sigma_2^I)^T \end{bmatrix}^T,$$

where $w_p$ represents a complex vector formed by connection weights between a $p^{th}$ input neuron and the hidden-layer neurons, $b_1$ represents a complex vector formed by biases of all the hidden-layer neurons, $\sigma_1$ represents a complex vector formed by gain coefficients of activation functions of the hidden-layer neurons, $v_n$ represents a complex vector formed by connection weights between an $n^{th}$ hidden-layer neuron and the output layer neurons, $b_2$ is a complex vector formed by biases of all the output layer neurons, $\sigma_2$ represents a complex vector formed by gain coefficients of activation functions of the output layer neurons, and the superscript T represents transpose; and the superscript R represents a vector formed by real parts of corresponding complex vectors, the superscript I represents a vector formed by imaginary parts of corresponding complex vectors, and $$ri(\cdot) = \begin{pmatrix} (\cdot)^R \\ (\cdot)^I \end{pmatrix};$$

and a gain coefficient of an activation function may be optimized together as an adjustable parameter, the activation functions of the hidden-layer neurons are prevented from falling in a saturated area, so that the adverse impact of the activation function falling in a saturated area on a training process is overcome.

When the input is a $j^{th}$ training sample, a hidden output vector of the feedforward complex-valued neural network is $h_j=f_C(Wz_j+b_1)$, and an output vector of an output layer is $o_j=f_C(Vh_j+b_2)$, where $f_C(\cdot)$ represents an activation function, $W=[w_1, w_2, \ldots, w_P]$ is a weight matrix between the input neurons and the hidden neurons, and $z_j$ is a $j^{th}$ input sample of the feedforward complex-valued neural network; and $V=[v_1, v_2, \ldots, v_N]$ is a weight matrix between the hidden neurons and the output neurons.

The parameter vector $\psi$ formed by parameters including connection weights between neurons, biases of neurons, and gain coefficients of activation functions in the feedforward complex-valued neural network are initialized.

Step 3: Introduce a Group Lasso regularization term to construct a target function for training of the feedforward complex-valued neural network, and convert the training of the feedforward complex-valued neural network into solving a constrained optimization problem. Iterative training is performed by using the training set and a specialized complex-valued projected quasi-Newton algorithm, so that redundant input neurons and hidden neurons are deleted, thereby implementing optimization of both a network structure and parameter vectors.

Figure 2:
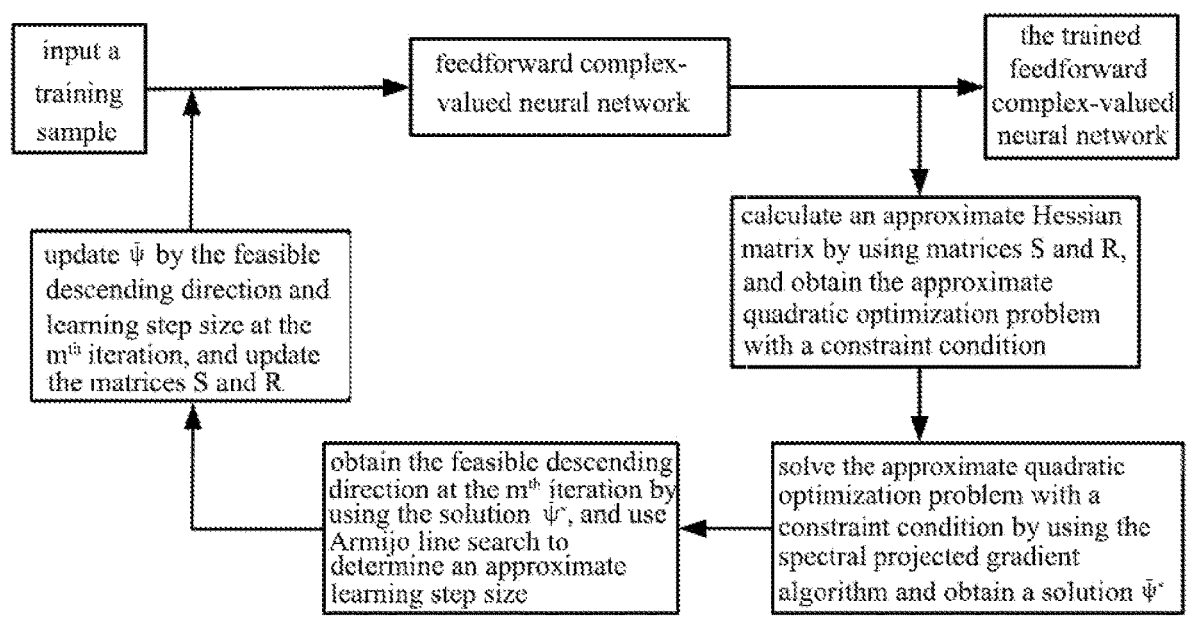
FIG. 2 shows the training process of a feedforward complex-valued neural network by using a specialized complex-valued projected quasi-newton algorithm in the present invention.
Figure 3:
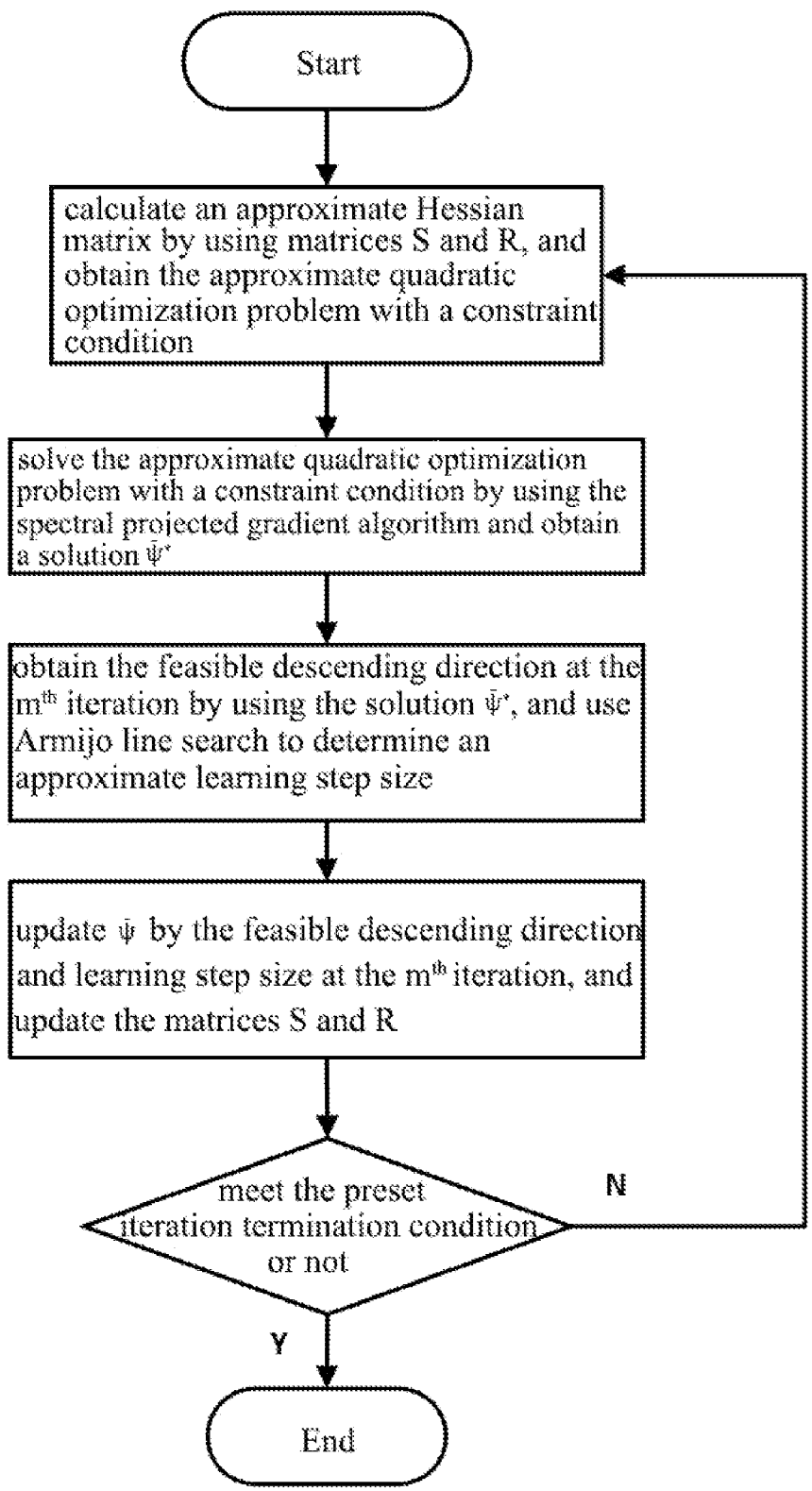
FIG. 3 is a flowchart of a training method using a specialized complex-valued projected quasi-newton algorithm in the present invention.

As shown in FIG. 2 and FIG. 3, a specific process of step 3 includes the following steps:

Step 3.1: Introduce a Group Lasso regularization term $R_{GL}$ into a traditional mean square error function E' to obtain a target function E for the training.

The Group Lasso regularization term $$R_{GL} = \lambda \sum_{a=1}^{A} \sqrt{|\psi_a|} \, \|\psi_a\|,$$

and the target function E for the training of the feedforward complex-valued neural network is:

$$\min_{\psi} E = E' + R_{GL} = \frac{1}{2J} \sum_{j=1}^{J} (o_j - y_j)^H (o_j - y_j) + \lambda \sum_{a=1}^{A} \sqrt{|\psi_a|} \, \|\psi_a\|,$$

where $$E' = \frac{1}{2J} \sum_{j=1}^{J} (o_j - y_j)^H (o_j - y_j)$$

is the traditional mean square error function, J is a total number of training samples, $o_j$ represents an actual output of a $j^{th}$ training sample, $y_j$ represents a desired output of the $j^{th}$ training sample, and the superscript H represents the conjugate transpose; $\lambda$ is a regularization coefficient, $a=1,2,\ldots,A$, $A=P+N+2$ represents a total number of neurons that may be penalized, that is, P input neurons, N hidden neurons, and 2 bias nodes; and $|\cdot|$ represents a dimension of a vector, $\|\cdot\|$ is a Euclidean norm, and $\psi_a$ represents a vector formed by connection weights between an $a^{th}$ neuron and all neurons in a next layer in the feedforward complex-valued neural network.

The Group Lasso regularization term is introduced into the traditional mean square error function to obtain the target function E for the training of the feedforward complex-valued neural network, so that redundant input neurons and hidden neurons can be effectively deleted during a training process, to implement optimization of a network structure and parameter vectors. Thereby enhancing the generalization performance of the model.

Step 3.2: Convert an unconstrained optimization problem into a constrained optimization problem, that is, introduce a group of artificial variables $\rho_a$ to convert an unconstrained optimization problem $$\min_{\psi} E = E' + \lambda \sum_{a=1}^{A} \sqrt{|\psi_a|} \, \|\psi_a\|$$

into a constrained optimization problem:

$$\min_{\overline{\psi}} E = E' + \lambda \sum_{a=1}^{A} \sqrt{|\psi_a|} \, \rho_a, \text{ s.t } \|\psi_a\| \leq \rho_a, a = 1, 2, \ldots, A;$$

and define $\rho = [\rho_1, \rho_2, \ldots, \rho_A]^T$ as a real vector formed by the introduced variables $\rho_a$, where a parameter vector that needs to be optimized during the training process is $\overline{\psi} = [\psi^T, \rho^T]^T$.

Step 3.3: Train the feedforward complex-valued neural network by using the training set and the specialized complex-valued projected quasi-Newton algorithm, calculate an approximate Hessian matrix $H^{(m)}$ by using matrices $$S = \{s^{(i)}\}_{i=m-\tau}^{i=m-1} \text{ and } R = \{r^{(i)}\}_{i=m-\tau}^{i=m-1},$$

and obtain an approximate quadratic optimization problem with a constraint condition, where $\tau$ is a constant, representing that a parameter variation $s^{(i)}$ and a gradient variation $r^{(i)}$ of the latest $\tau$ iterations are kept; and $s^{(i)} = \overline{\psi}^{(i+1)} - \overline{\psi}^{(i)}$, $r^{(i)} = \nabla E(\overline{\psi}^{(i+1)}) - \nabla E(\overline{\psi}^{(i)})$, $\overline{\psi}^{(i+1)}$ represents a parameter vector value at an $(i+1)^{th}$ iteration, $\overline{\psi}^{(i)}$ represents a parameter vector value at an $i^{th}$ iteration, $\nabla E(\overline{\psi}^{(i)})$ represents a gradient of the target function E at $\overline{\psi}^{(i)}$, $\nabla E(\overline{\psi}^{(i+1)})$ represents a gradient of the target function E at $\overline{\psi}^{(i+1)}$, S represents a matrix formed by parameter variations $s^{(i)}$ from the $(m-\tau)^{th}$ to $(m-1)^{th}$ iterations, R represents a matrix formed by gradient variations $r^{(i)}$ from the $(m-\tau)^{th}$ to $(m-1)^{th}$ iterations, and m represents the iteration index.

Step 3.3.1: Use a calculation formula of the approximate Hessian matrix $H^{(m)}$:

$$H^{(m)} = \sigma^{(m)} I - NM^{-1} N^T,$$

where $$\sigma^{(m)} = \frac{(r^{(m-1)})^T r^{(m-1)}}{(r^{(m-1)})^T s^{(m-1)}},$$

$r^{(m-1)} = \nabla E(\overline{\psi}^{(m)}) - \nabla E(\overline{\psi}^{(m-1)})$, and $s^{(m-1)} = \overline{\psi}^{(m)} - \overline{\psi}^{(m-1)}$; and I is an identity matrix, $$N = [\sigma^{(m)} SR], M = \begin{bmatrix} \sigma^{(m)} S^T S & L \\ L & -D \end{bmatrix},$$

L is a matrix formed by elements $$L_{ij} = \begin{cases} (s^{(m-\tau-1+i)})^T (r^{(m-\tau-1+j)}) & i > j \\ 0 & i \leq j \end{cases},$$

and $D = \text{diag}[(s^{(m-\tau)})^T (r^{(m-\tau)}), \ldots, (s^{(m-1)})^T (r^{(m-1)})]$ is a diagonal matrix.

Step 3.3.2: Obtain the approximate quadratic optimization problem with a constraint condition at the $m^{th}$ iteration by using the approximate Hessian matrix $H^{(m)}$:

$$\min_{\overline{\Psi}} Q = E(\overline{\Psi}^{(m)}) + (\overline{\Psi} - \overline{\Psi}^{(m)})^T \nabla E(\overline{\Psi}^{(m)}) + \frac{1}{2} (\overline{\Psi} - \overline{\Psi}^{(m)})^T H^{(m)} (\overline{\Psi} - \overline{\Psi}^{(m)})$$

$$\text{s.t } \|\Psi_a\| \leq \rho_a, a = 1, 2, \ldots, A.$$

step 3.4: Solve the approximate quadratic optimization problem with a constraint condition by using a spectral projected gradient algorithm, to obtain a solution $\overline{\psi}^*$ of the approximate quadratic optimization problem with a constraint condition.

The approximate quadratic optimization problem with a constraint condition is solved according to the spectral projected gradient algorithm to obtain the solution $\overline{\psi}^*$. The main characteristic of the spectral projected gradient algorithm is that a spectral step size is used as an initial step size, and a learning step size $\eta_q^{(t)}$ is determined by using a nonmonotone linear search. A specific form of the spectral step size is as follows:

$$\eta_{bb}^{(t)} = \frac{(qs^{(t-1)})^T qs^{(t-1)}}{(qr^{(t-1)})^T qs^{(t-1)}},$$

where $qs^{(t-1)} = \overline{\psi}^{(t)} - \overline{\psi}^{(t-1)}$, $qr^{(t-1)} = \nabla Q(\overline{\psi}^{(t)}) - \nabla Q(\overline{\psi}^{(t-1)})$, $\nabla Q(\overline{\psi}^{(t)})$ represents a gradient of a target function Q of the approximate quadratic optimization problem with a constraint condition at $\overline{\psi}^{(t)}$, and t represents the iteration index for optimizing the approximate quadratic optimization problem with a constraint condition by using the spectral projected gradient algorithm, that is, the $t^{th}$ iteration of the spectral projected gradient algorithm.

At the $t^{th}$ iteration, an initial solution $\overline{\psi}_+^{(t)} = \overline{\psi}^{(t)} - \eta_{bb}^{(t)} \nabla Q(\overline{\psi}^{(t)})$ of the target function Q of the approximate quadratic optimization problem with a constraint condition is first calculated by using a negative gradient direction. However, $\overline{\psi}_+^{(t)}$ calculated in this case does not necessarily meet a constraint condition $\|\psi_a\| \leq \rho_a$, a=1,2, ... ,A.

$$P_\Omega(\psi_a, \rho_a) = \begin{cases} (\psi_a, \rho_a) & \|\psi_a\| \leq \rho_a \\ \left(\frac{\psi_a}{\|\psi_a\|} \frac{\|\psi_a\|+\rho_a}{2}, \frac{\|\psi_a\|+\rho_a}{2}\right) & \|\psi_a\| > \rho_a, \|\psi_a\|+\rho_a > 0 \\ (0,0) & \|\psi_a\| > \rho_a, \|\psi_a\|+\rho_a \leq 0 \end{cases}$$

Therefore, parameters of each group of neurons are corrected by using a projection operator to make the parameters meet a constraint condition. For example, for a weight vector $\psi_1 = ri(w_1)$ and a parameter $\rho_1$ of a first input neuron, if $\|\psi_1\| \leq \rho_1$, a weight parameter of the neuron does not need to be corrected. That is, the first case in the foregoing formula takes place. If $\|\psi_1\| > \rho_1$ and $\|\psi_1\| + \rho_1 > 0$, the parameter is corrected to $$\left(\frac{\psi_1}{\|\psi_1\|} \frac{\|\psi_1\|+\rho_1}{2}, \frac{\|\psi_1\|+\rho_1}{2}\right)$$

by using a projection operator to meet the constraint condition. If $\|\psi_1\| > \rho_1$ and $\|\psi_1\| + \rho_1 \leq 0$, the parameter of the neuron is corrected to (0, 0) by using a projection operator. That is, the third case in the foregoing formula takes place. In this case, a feasible descending direction $d_q^{(t)}$ for solving the approximate quadratic optimization problem with a constraint condition is obtained by using $d_q^{(t)} = \overline{\psi}_p^{(t)} - \overline{\psi}^{(t)}$. $\overline{\psi}_p^{(t)}$ is a solution obtained after the foregoing projection operation is performed on each group of neuron parameters in $\overline{\psi}_+^{(t)}$.

Next, the step size $\eta_q^{(t)}$ is determined by using a nonmonotone line search. A specific form is as follows:

$$Q(\overline{\psi}^{(t)} + \eta_q^{(t)} d_q^{(t)}) \leq \max_{t-k \leq i \leq t} Q(\overline{\psi}^{(i)}) + l_3 \eta_q^{(t)} \nabla Q(\overline{\psi}^{(t)})^T d_q^{(t)},$$

$l_3 \in (0,1)$, the value of k is usually 10, and $d_q^{(t)}$ represents a search direction of the approximate quadratic optimization problem with a constraint condition at the $t^{th}$ iteration.

Iterations are repeatedly performed, and stop when a stop condition of the projected gradient algorithm is reached, to obtain a solution $\overline{\psi}^*$ to the quadratic optimization problem with a constraint condition.

To describe the spectral projected gradient algorithm more intuitively, a specific procedure of the spectral projected gradient algorithm is summarized as follows:

Step 3.4.1: Calculate $\eta_{bb}^{(t)}$ by using a formula $$\eta_{bb}^{(t)} = \frac{(qs^{(t-1)})^T qs^{(t-1)}}{(qr^{(t-1)})^T qs^{(t-1)}},$$

and calculate $\overline{\psi}_+^{(t)}$ according to a formula $\overline{\psi}_+^{(t)} = \overline{\psi}^{(t)} - \eta_{bb}^{(t)} \nabla Q(\overline{\psi}^{(t)})$, where $qs^{(t-1)} = \overline{\psi}^{(t)} - \overline{\psi}^{(t-1)}$, $qr^{(t-1)} = \nabla Q(\overline{\psi}^{(t)}) - \nabla Q(\overline{\psi}^{(t-1)})$, $\nabla Q(\overline{\psi}^{(t)})$ represents a gradient of the target function of the approximate quadratic optimization problem with a constraint condition at $\overline{\psi}^{(t)}$, and t represents the iteration index for optimizing the approximate quadratic optimization problem with a constraint condition by using the spectral projected gradient algorithm.

Step 3.4.2: Correct parameters of each group of neurons in $\overline{\psi}_+^{(t)}$ by using a projection operator $$P_\Omega(\psi_a, \rho_a) = \begin{cases} (\psi_a, \rho_a) & \|\psi_a\| \leq \rho_a \\ \left(\frac{\psi_a}{\|\psi_a\|} \frac{\|\psi_a\|+\rho_a}{2}, \frac{\|\psi_a\|+\rho_a}{2}\right) & \|\psi_a\| > \rho_a, \|\psi_a\|+\rho_a > 0 \\ (0,0) & \|\psi_a\| > \rho_a, \|\psi_a\|+\rho_a \leq 0 \end{cases}$$

to make the parameters meet a constraint condition $\|\psi_a\| \leq \rho_a$, a=1, 2, ... , A, and calculate $\overline{\psi}_p^{(t)}$.

Weights of redundant neurons in the feedforward complex-valued neural network are directly reset by using a projection operator, a threshold does not need to be set in advance, and redundant neurons can be directly deleted without causing any impact on a final output of a model, that is, the optimized selection of both a network structure and parameter vectors can be implemented, to make the structure of the feedforward complex-valued neural network compact.

Step 3.4.3: Obtain, according to a formula $d_q^{(t)} = \overline{\psi}_p^{(t)} - \overline{\psi}^{(t)}$, a search direction $d_q^{(t)}$ of solving the approximate quadratic optimization problem with a constraint condition at a $t^{th}$ iteration.

Step 3.4.4: Calculate a learning step size $\eta_q^{(t)}$ in the search direction $d_q^{(t)}$ by using a nonmonotone line search:

$$Q(\overline{\psi}^{(t)} + \eta_q^{(t)} d_q^{(t)}) \leq \max_{t-k \leq i \leq t} Q(\overline{\psi}^{(i)}) + l_3 \eta_q^{(t)} \nabla Q(\overline{\psi}^{(t)})^T d_q^{(t)}, l_3 \in (0,1).$$

Step 3.4.5: Update the parameters according to a formula $\overline{\psi}^{(t+1)} = \overline{\psi}^{(t)} + \eta_q^{(t)} d_q^{(t)}$, and determine whether the quantity of times of evaluation of the target function of the approximate quadratic optimization problem with a constraint condition is greater than a preset constant $T_e$. The value of $T_e$ in this embodiment is 10.

If not, the process returns to step 3.4.1, or if yes, the algorithm stops, to obtain a solution $\overline{\psi}^*$ of the approximate quadratic optimization problem with a constraint condition.

step 3.5: Calculate a feasible descending direction $d^{(m)}$ of the original constrained optimization problem $$\min_{\overline{\psi}} E = E' + \lambda \sum_{a=1}^{A} \sqrt{|\psi_a|} \rho_a, \text{ s.t. } \|\psi_a\| \leq \rho_a, a = 1, 2, \ldots, A$$

at $m^{th}$ iteration by using the solution $\overline{\psi}^*$ of the approximate quadratic optimization problem with a constraint condition, and use Armijo line search to determine an approximate learning step size $\eta^{(m)}$.

Step 3.5.1: At the $m^{th}$ iteration of the specialized complex-valued projected quasi-Newton algorithm, first calculate a solution $\overline{\psi}^*$ of the quadratic optimization problem with a constraint condition by using the spectral projected gradient algorithm, and then obtain, according to a formula $d^{(m)}=\overline{\psi}^*-\overline{\psi}^{(m)}$, the feasible descending direction $d^{(m)}$ of the original constrained optimization problem $$\min_{\overline{\psi}} E = E' + \lambda \sum_{a=1}^{A} \sqrt{|\psi_a|} \rho_a \text{ s.t } \|\psi_a\| \leq \rho_a, a = 1, 2, \ldots, A$$

at the $m^{th}$ iteration.

Step 3.5.2: Determine an appropriate learning step size $\eta^{(m)}$ by using Armijo line search at the $m^{th}$ iteration of the specialized complex-valued projected quasi-Newton algorithm:

$$E(\overline{\psi}^{(m)}+\eta^{(m)}d^{(m)}) \leq E(\overline{\psi}^{(m)})+l_4\eta^{(m)}\nabla E(\overline{\psi}^{(m)})^T d^{(m)},$$

where $l_4 \in (0, 1)$, $d^{(m)}$ represents a feasible descending direction of the original constrained optimization problem $$\min_{\overline{\psi}} E = E' + \lambda \sum_{a=1}^{A} \sqrt{|\psi_a|} \rho_a \text{ s.t } \|\psi_a\| \leq \rho_a, a = 1, 2, \ldots, A$$

at the $m^t$ iteration, and $\nabla E(\overline{\psi}^{(m)})$ represents a gradient of the target function E at $\overline{\psi}^{(m)}$.

Step 3.6: Update $\overline{\psi}$ by using $d^{(m)}$ and $\eta^{(m)}$, and update the matrices S and R, update, according to a formula $\overline{\psi}^{(m+1)}=\overline{\psi}^{(m)}+\eta^{(m)}d^{(m)}$, a parameter vector $\overline{\psi}$ that needs to be optimized in the feedforward complex-valued neural network, and calculate $s^{(m)}=\overline{\psi}^{(m+1)}-\overline{\psi}^{(m)}$ and $r^{(m)}=\nabla E(\overline{\psi}^{(m+1)})-\nabla E(\overline{\psi}^{(m)})$, store the informations of $s^{(m)}$ and $r^{(m)}$ in matrices S and R, and discard the information about $s^{(m-\tau)}$ and $r^{(m-\tau)}$ of the $(m-\tau)^{th}$ iteration from the matrices S and R, to implement update of S and R. The value of $\tau$ in this embodiment is 10.

Step 3.7: Repeat the specialized complex-valued projected quasi-Newton algorithm in step 3.3 to step 3.6 to perform iterative training, and stop the training of the feedforward complex-valued neural network when a preset iteration termination condition is met, to complete iterative training of $\overline{\psi}$. The preset iteration termination condition is specifically: the quantity of times of evaluation of the target function during the training of the feedforward complex-valued neural network reaches a preset maximum quantity of times of evaluation or a variation between the values of the target function in two consecutive iterations is less than a preset threshold or a maximum variation of an adjustable parameter in $\overline{\psi}$ is less than a preset threshold (that is, a stagnated state is entered). The training is stopped if the iteration termination condition is met, and the trained feedforward complex-valued neural network is used for wind speed prediction. The process turns to step 3.3 to continue to train the feedforward complex-valued neural network if the iteration termination condition is not met.

Step 4: Obtain the trained feedforward complex-valued neural network, and input the prediction data into the trained feedforward complex-valued neural network to obtain a wind speed prediction result. A desired output is a complex number y formed by a wind speed and a wind direction.

To further describe the beneficial effects of the present invention, 2000 samples are selected for training a feedforward complex-valued neural network containing 20 hidden neurons in this embodiment, and 100 other samples are used to test the performance of the feedforward complex-valued neural network. The present invention (which is named as SC_PQN for convenience) is compared with a split gradient descent training method (SCBPG) and a fully complex gradient descent training method (FCBPG). The training and test errors are presented in Table 1.

TABLE 1

Comparison of result of training and test errors of SC_PQN, SCBPG, and FCBPG

|  | SCBPG | FCBPG | SC_PQN |
| --- | --- | --- | --- |
| Average training error | 0.0663 | 0.0904 | 0.0656 |
| Average test error | 0.1246 | 0.1605 | 0.0840 |
| Quantity of deleted hidden-layer | 0 | 0 | 14 |
| Quantity of deleted input neurons | 0 | 0 | 2 |

As can be seen from Table 1, when the present invention uses a specialized complex-valued projected quasi-Newton algorithm, both the average training error and the average test error are minimal, and the optimal training and prediction effects are obtained. In addition, compared with other training methods, both the quantity of deleted hidden neurons and the quantity of deleted input neurons are provided in the present invention. After these redundant neurons are deleted, a network structure can be optimized to obtain a feedforward complex-valued neural network with more compact structure, thereby enhancing the generalization performance of the model.

Compared with the prior art, the foregoing technical solution of the present invention has the following advantages: For the wind speed prediction method based on a feedforward complex-valued neural network in the present invention: (1) During a training process, a Group Lasso regularization term is introduced into a traditional mean square error function to obtain a target function E for the training of a feedforward complex-valued neural network, so that redundant input neurons and hidden neurons can be effectively deleted during training, to implement optimization of a network structure and parameter vectors. (2) A feedforward complex-valued neural network is trained by using a specialized complex-valued projected quasi-Newton algorithm, gain coefficients of activation functions may be optimized together as adjustable parameters, so that the adverse impact of activation function falling in a saturated area during a training process is overcome. In addition, weights of redundant neurons in the feedforward complex-valued neural network are directly reset, where a threshold does not need to be set in advance, and redundant neurons can be directly deleted without causing any impact on a final output of a model, that is, the optimization of both a network structure and parameter vectors can be implemented. (3) A Group Lasso regularization term is introduced and a feedforward complex-valued neural network is trained by using a specialized complex-valued projected quasi-Newton algorithm, and optimization of a network structure and parameters are implemented, so that the structure of the feedforward complex-valued neural network is compact, the generalization performance of a network model is enhanced, and the feedforward complex-valued neural network has smaller errors for wind speed prediction, thereby improving the accuracy of prediction.

A person skilled in the art should understand that the embodiments of the present application may be provided as a method, a system or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. A wind speed prediction method based on a feedforward complex-valued neural network, comprising steps of:
   step 1: acquiring data for wind speed prediction, arranging the data as a data set, and dividing the data set into a training set and a prediction set;
   step 2: constructing a feedforward complex-valued neural network, and initializing a parameter vector $\psi$, wherein the parameter vector $\psi$ is formed by adjustable parameters comprising connection weights between neurons, biases of hidden and output neurons, and gain coefficients of activation function;
   step 3: introducing a Group Lasso regularization term to construct a target function for training the feedforward complex-valued neural network, and converting the training of the feedforward complex-valued neural network into solving a constrained optimization problem; and training the feedforward complex-valued neural network by using the training data and a specialized complex-valued projected quasi-Newton algorithm, and stopping the training until a preset iteration termination condition is met; and
   step 4: obtaining the trained feedforward complex-valued neural network, and inputting the prediction set into the trained feedforward complex-valued neural network to obtain a wind speed prediction result.

2. The wind speed prediction method based on a feedforward complex-valued neural network according to claim 1, wherein in step 2, the constructed feedforward complex-valued neural network comprises P input neurons, N hidden-layer neurons, and Q output neurons, the parameter vector $\psi$ in the feedforward complex-valued neural network is a column vector, and all the adjustable parameters are arranged in an order to obtain the parameter vector $\psi$:

$$\Psi = \begin{bmatrix} (w_1^R)^T, (w_1^I)^T, \ldots, (w_P^R)^T, (w_P^I)^T, (b_1^R)^T, (b_1^I)^T, (\sigma_1^R)^T, (\sigma_1^I)^T, \\ (v_1^R)^T, (v_1^I)^T, \ldots, (v_N^R)^T, (v_N^I)^T, (b_2^R)^T, (b_2^I)^T, (\sigma_2^R)^T, (\sigma_2^I)^T \end{bmatrix}^T = \begin{bmatrix} (ri(w_1))^T, \ldots, (ri(w_P))^T, (ri(b_1))^T, (\sigma_1^R)^T, (\sigma_1^I)^T, \\ (ri(v_1))^T, \ldots, (ri(v_N))^T, (ri(b_2))^T, (\sigma_2^R)^T, (\sigma_2^I)^T \end{bmatrix}^T$$

wherein $w_p$ represents a complex vector formed by connection weights between a $p^{th}$ input neuron and the hidden neurons, $b_1$ represents a complex vector formed by biases of all the hidden neurons, $\sigma_1$ represents a complex vector formed by gain coefficients of activation functions of the hidden neurons, $v_n$ represents a complex vector formed by connection weights between an $n^{th}$ hidden-layer neuron and the output neurons, $b_2$ is a complex vector formed by biases of all the output neurons, $\sigma_2$ represents a complex vector formed by gain coefficients of activation functions of the output neurons, and the superscript T represents transpose; and the superscript R represents a vector formed by real parts of corresponding complex vector, the superscript I represents a vector formed by imaginary parts of corresponding complex vector, and $$ri(\cdot) = \begin{pmatrix} (\cdot)^R \\ (\cdot)^I \end{pmatrix};$$

and
a hidden output vector of the feedforward complex-valued neural network is $h_j = f_c(Wz_j + b_1)$, and an output vector of the output layer is $o_j = f_c(Vh_j + b_2)$, wherein $f_c(\bullet)$ represents an activation function, $W = [w_1, w_2, \ldots, w_P]$ is a weight matrix between the input and hidden neurons, and $z_j$ is a $j^{th}$ input sample of the feedforward complex-valued neural network; and $V = [v_1, v_2, \ldots, v_N]$ is a weight matrix between the hidden and output neurons.

3. The wind speed prediction method based on a feedforward complex-valued neural network according to claim 1, wherein the step 3 further comprises:

step 3.1: introducing a Group Lasso regularization term $R_{GL}$ into a traditional mean square error function E' to obtain a target function E during the training of the feedforward complex-valued neural network;

step 3.2: introducing a group of artificial variables $\rho_a$ to convert an unconstrained optimization problem $$\min_{\psi} E = E' + \lambda \sum_{a=1}^{A} \sqrt{|\psi_a|} \|\psi_a\|$$

into a constrained optimization problem $$\min_{\bar{\psi}} E = E' + \lambda \sum_{a=1}^{A} \sqrt{|\psi_a|} \rho_a, \text{ s.t. } \|\psi_a\| \leq \rho_a, a = 1, 2, \ldots, A;$$

and defining $\rho=[\rho_1, \rho_2, \ldots, \rho_A]^T$ as a real vector formed by the introduced variables $\rho_a$, wherein a parameter vector that needs to be optimized during the training process in this case is $\bar{\psi}=[\psi^T, \rho^T]^T$;

step 3.3: calculating an approximate Hessian matrix $H^{(m)}$ by using matrices $$S = \{s^{(i)}\}_{i=m-\tau}^{i=m-1} \text{ and } R = \{r^{(i)}\}_{i=m-\tau}^{i=m-1},$$

and obtaining an approximate quadratic optimization problem with a constraint condition, wherein $\tau$ is a constant, representing that a parameter variation $s^{(i)}$ and a gradient variation $r^{(i)}$ of the latest t iterations are kept; and $s^{(i)}=\bar{\psi}^{(i+1)}-\bar{\psi}^{(i)}$, $r^{(i)}=\nabla E(\bar{\psi}^{(i+1)})-\nabla E(\bar{\psi}^{(i)})$, $\bar{\psi}^{(i+1)}$ represents a parameter vector value of $\bar{\psi}$ at the $(i+1)^{th}$ iteration, $\bar{\psi}^{(i)}$ represents a parameter vector value of $\bar{\psi}$ at the $i^{th}$ iteration, $\nabla E(\bar{\psi}^{(i)})$ represents a gradient of the target function E at $\bar{\psi}^{(i)}$, $\nabla E(\bar{\psi}^{(i+1)})$ represents a gradient of the target function E at $\bar{\psi}^{(i+1)}$, S represents a matrix formed by parameter variations $s^{(i)}$ from the $(m-\tau)^{th}$ to $(m-1)^{th}$ iterations, R represents a matrix formed by gradient variations $r^{(i)}$ from the $(m-\tau)^{th}$ to $(m-1)^{th}$ iterations, and m represents an iteration number;

step 3.4: solving the approximate quadratic optimization problem with a constraint condition by using a spectral projected gradient algorithm, to obtain a solution $\bar{\psi}^*$ of the approximate quadratic optimization problem with a constraint condition;

step 3.5: calculating a feasible descending direction $d^{(m)}$ of the original constrained optimization problem $$\min_{\bar{\psi}} E = E' + \lambda \sum_{a=1}^{A} \sqrt{|\psi_a|} \rho_a, \text{ s.t. } \|\psi_a\| \leq \rho_a, a = 1, 2, \ldots, A$$

at the $m^{th}$ iteration by using the solution $\bar{\psi}^*$ of the approximate quadratic optimization problem with a constraint condition, and using Armijo line search to determine an approximate learning step size $\eta^{(m)}$;

step 3.6: updating $\bar{\psi}$ by using $d^{(m)}$ and $\eta^{(m)}$, and updating the matrices S and R;

step 3.7: repeating step 3.3 to step 3.6, and stopping the training of the feedforward complex-valued neural network until the preset iteration termination condition is met.

4. The wind speed prediction method based on a feedforward complex-valued neural network according to claim 3, wherein the Group Lasso regularization term in step 3.1 is $$R_{GL} = \lambda \sum_{a=1}^{A} \sqrt{|\psi_a|} \|\psi_a\|,$$

and the target function E for the training of the feedforward complex-valued neural network is:

$$\min_{\psi} E = E' + R_{GL} = \frac{1}{2J} \sum_{j=1}^{J} (o_j - y_j)^H (o_j - y_j) + \lambda \sum_{a=1}^{A} \sqrt{|\psi_a|} \|\psi_a\|,$$

wherein $E' = \frac{1}{2J} \sum_{j=1}^{J} (o_j - y_j)^H (o_j - y_j)$ is the traditional mean square error function, J is a total number of training samples, $o_j$ represents an actual output of a $j^{th}$ training sample, $y_j$ represents a desired output of the $j^{th}$ training sample, and the superscript H represents the conjugate transpose; $\gamma$ is a regularization coefficient, $a=1,2,\ldots,A$, $A=P+N+2$ represents a total number of neurons that may be penalized, that is, P input neurons, N hidden neurons, and 2 bias nodes; and $|\cdot|$ represents a dimension of a vector, $\|\cdot\|$ is a Euclidean norm, and $\psi_a$ represents a vector formed by connection weights between an $a^{th}$ neuron and all neurons in a next layer in the feedforward complex-valued neural network.

5. The wind speed prediction method based on a feedforward complex-valued neural network according to claim 3, wherein the step 3.3 further comprises:

step 3.3.1: using a calculation formula of the approximate Hessian matrix $H^{(m)}$:

$$H^{(m)} = \sigma^{(m)} I - N M^{-1} N^T,$$

wherein $$\sigma^{(m)} = \frac{(r^{(m-1)})^T r^{(m-1)}}{(r^{(m-1)})^T s^{(m-1)}},$$

$r^{(m-1)}=\nabla E(\bar{\psi}^{(m)})-\nabla E(\bar{\psi}^{(m-1)})$, and $s^{(m-1)}=\bar{\psi}^{(m)}-\bar{\psi}^{(m-1)}$; $N=[\sigma^{(m)} S \ R]$, $$M = \begin{bmatrix} \sigma^{(m)} S^T S & L \\ L & -D \end{bmatrix},$$

L is a matrix formed by elements $$L_{ij} = \begin{cases} (s^{(m-\tau-1+i)})^T (r^{(m-\tau-1+j)}) & i > j \\ 0 & i \leq j \end{cases},$$

I is an identity matrix, and $D=\text{diag}[(s^{(m-\tau)})^T (r^{(m-\tau)}), \ldots, (s^{(m-1)})^T (r^{(m-1)})]$ is a diagonal matrix; and step 3.3.2: obtaining the approximate quadratic optimization problem with a constraint condition at the $m^{th}$ iteration by using the approximate Hessian matrix $H^{(m)}$:

$$\min_{\Psi} Q = E(\Psi^{(m)}) + (\Psi - \Psi^{(m)})^T \nabla E(\Psi^{(m)}) + \frac{1}{2}(\Psi - \Psi^{(m)})^T H^{(m)}(\Psi - \Psi^{(m)})$$

$$\text{s.t. } \|\Psi_a\| \le \rho_a, a = 1, 2, \ldots, A.$$

6. The wind speed prediction method based on a feedforward complex-valued neural network according to claim 3, wherein the step 3.4 comprises:

3.4.1: calculating $\eta_{bb}^{(t)}$ by using a formula $$\eta_{bb}^{(t)} = \frac{(qs^{(t-1)})^T qs^{(t-1)}}{(qr^{(t-1)})^T qs^{(t-1)}},$$

and calculating $\overline{\psi}_+^{(t)}$ according to a formula $\overline{\psi}_+^{(t)} = \overline{\psi}^{(t)} - \eta_{bb}^{(t)} \nabla Q(\overline{\psi}^{(t)})$, where $qs^{(t-1)} = \overline{\psi}^{(t)} - \overline{\psi}^{(t-1)}$, $qr^{(t-1)} = \nabla Q(\overline{\psi}^{(t)}) - \nabla Q(\overline{\psi}^{(t-1)})$, $\nabla Q(\overline{\psi}^{(t)})$ represents a gradient of the target function of the approximate quadratic optimization problem with a constraint condition at $\overline{\psi}^{(t)}$, and t represents a iteration number for optimizing the approximate quadratic optimization problem with a constraint condition by using the spectral projected gradient algorithm;

step 3.4.2: correcting parameters of each group of neurons in $\overline{\psi}_+^{(t)}$ by using a projection operator $$P_\Omega(\psi_a, \rho_a) = \begin{cases} (\psi_a, \rho_a) & \|\psi_a\| \le \rho_a \\ \left(\frac{\psi_a}{\|\psi_a\|} \frac{\|\psi_a\| + \rho_a}{2}, \frac{\|\psi_a\| + \rho_a}{2}\right) & \|\psi_a\| > \rho_a, \|\psi_a\| + \rho_a > 0 \\ (0, 0) & \|\psi_a\| > \rho_a, \|\psi_a\| + \rho_a \le 0 \end{cases}$$

to make the parameters meet a constraint condition $\|\psi_a\| \le \rho_a$, a=1,2, ..., A, and calculating $\overline{\psi}_p^{(t)}$;

step 3.4.3: obtaining, according to a formula $d_q^{(t)} = \overline{\psi}_p^{(t)} - \overline{\psi}^{(t)}$, a search direction $d_q^{(t)}$ of solving the approximate quadratic optimization problem with a constraint condition at the $t^{th}$ iteration;

step 3.4.4: obtaining a learning step size $\eta_q^{(t)}$ of the search direction $d_q^{(t)}$ by using a nonmonotone line search:

$$Q(\overline{\psi}^{(t)} + \eta_q^{(t)} d_q^{(t)}) \le \max_{t-k \le i \le t} Q(\overline{\psi}^{(i)}) + l_3 \eta_q^{(t)} \nabla Q(\overline{\psi}^{(t)})^T d_q^{(t)}, l_3 \in (0, 1);$$

and step 3.4.5: updating the parameters according to a formula $\overline{\psi}^{(t+1)} = \overline{\psi}^{(t)} + \eta_q^{(t)} d_q^{(t)}$, and determining whether a quantity of times of evaluation of the target function of the approximate quadratic optimization problem with a constraint condition is greater than a preset constant $T_e$, wherein if not, the process returns to step 3.4.1, or if yes, the algorithm stops, to obtain a solution $\overline{\psi}^*$ of the approximate quadratic optimization problem with a constraint condition.

7. The wind speed prediction method based on a feedforward complex-valued neural network according to claim 3, wherein a calculation method of the feasible descending direction $d^{(m)}$ in step 3.5 comprises:

at the $m^{th}$ iteration of the specialized complex-valued projected quasi-Newton algorithm, first calculating a solution $\overline{\psi}^*$ of the quadratic optimization problem with a constraint condition by using the spectral projected gradient algorithm, and then obtaining the feasible descending direction $d^{(m)}$ of the original constrained optimization problem $$\min_{\Psi} E = E' + \lambda \sum_{a=1}^{A} \sqrt{|\psi_a|} \rho_a, \text{ s.t } \|\psi_a\| \le \rho_a, a = 1, 2, \ldots, A$$

at the $m^{th}$ iteration according to a formula $d^{(m)} = \overline{\psi}^* - \overline{\psi}^{(m)}$.

8. The wind speed prediction method based on a feedforward complex-valued neural network according to claim 3, wherein the used Armijo line search to determine an approximate learning step size $\eta^{(m)}$ in step 3.5 comprises:

determining an appropriate learning step size $\eta^{(m)}$ by using Armijo line search at the $m^{th}$ iteration of the specialized complex-valued projected quasi-Newton algorithm:

$$E(\overline{\psi}^{(m)} + \eta^{(m)} d^{(m)}) \le E(\overline{\psi}^{(m)}) + l_4 \eta^{(m)} \nabla E(\overline{\psi}^{(m)})^T d^{(m)},$$

where $l_4 \in (0, 1)$, $d^{(m)}$ represents a feasible descending direction of the original constrained optimization problem $$\min_{\Psi} E = E' + \lambda \sum_{a=1}^{A} \sqrt{|\psi_a|} \rho_a \text{ s.t } \|\psi_a\| \le \rho_a, a = 1, 2, \ldots, A$$

at the $m^{th}$ iteration, and $\nabla E(\overline{\psi}^{(m)})$ represents a gradient of the target function E at $\overline{\psi}^{(m)}$.

9. The wind speed prediction method based on a feedforward complex-valued neural network according to claim 3, wherein the updating $\overline{\psi}$ by using $d^{(m)}$ and $\eta^{(m)}$, and updating the matrices S and R in step 3.6 comprise:

updating, according to a formula $\overline{\psi}^{(m+1)} = \overline{\psi}^{(m)} + \eta^{(m)} d^{(m)}$, a parameter vector $\overline{\psi}$ that needs to be optimized in the feedforward complex-valued neural network, calculate $s^{(m)} = \overline{\psi}^{(m+1)} - \overline{\psi}^{(m)}$ and $r^{(m)} = \nabla E(\overline{\psi}^{(m+1)}) - \nabla E(\overline{\psi}^{(m)})$, storing the informations of $s^{(m)}$ and $r^{(m)}$ in matrices S and R, and discard the information about $s^{(m-\tau)}$ and $r^{(m-\tau)}$ of the $(m-\tau)^{th}$ iteration from the matrices S and R, to implement the update of S and R.

10. The wind speed prediction method based on a feedforward complex-valued neural network according to claim 1, wherein the preset iteration termination condition in step 3 is:

a quantity of times of evaluation of the target function during the training of the feedforward complex-valued neural network reaches a preset maximum quantity of times of evaluation, or a variation between the values of the target function in two consecutive iterations is less than a preset threshold, or a maximum variation of an adjustable parameter in $\overline{\psi}$ is less than a preset threshold.

* * * * *